M. M. MURCHISON.
CANE STRIPPING APPARATUS.
APPLICATION FILED MAR. 11, 1916.
1,254,926.
Patented Jan. 29, 1918.
3 SHEETS—SHEET 1.
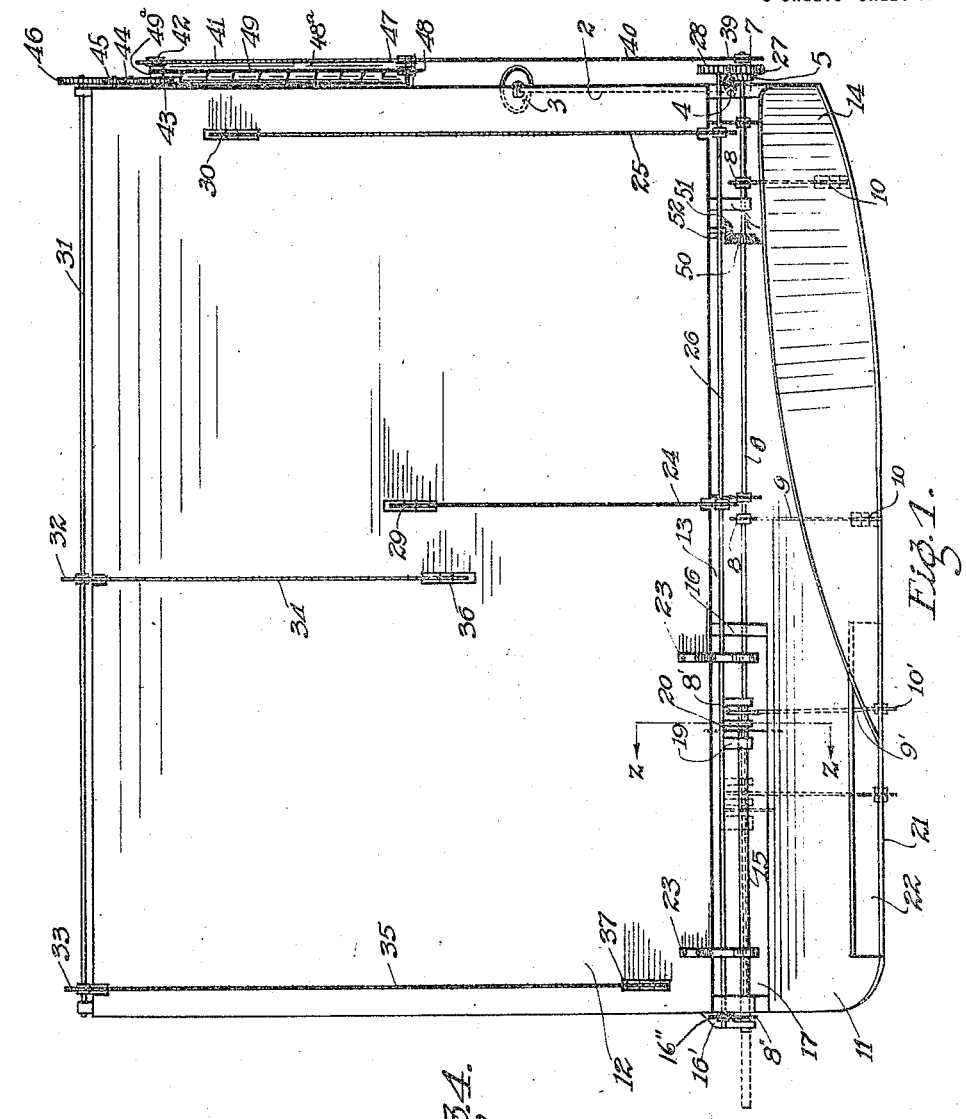
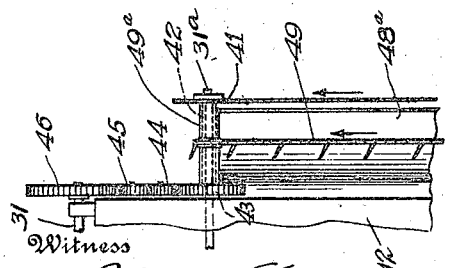
Witness
Inventor
M.M.Murchison
By
Attorney

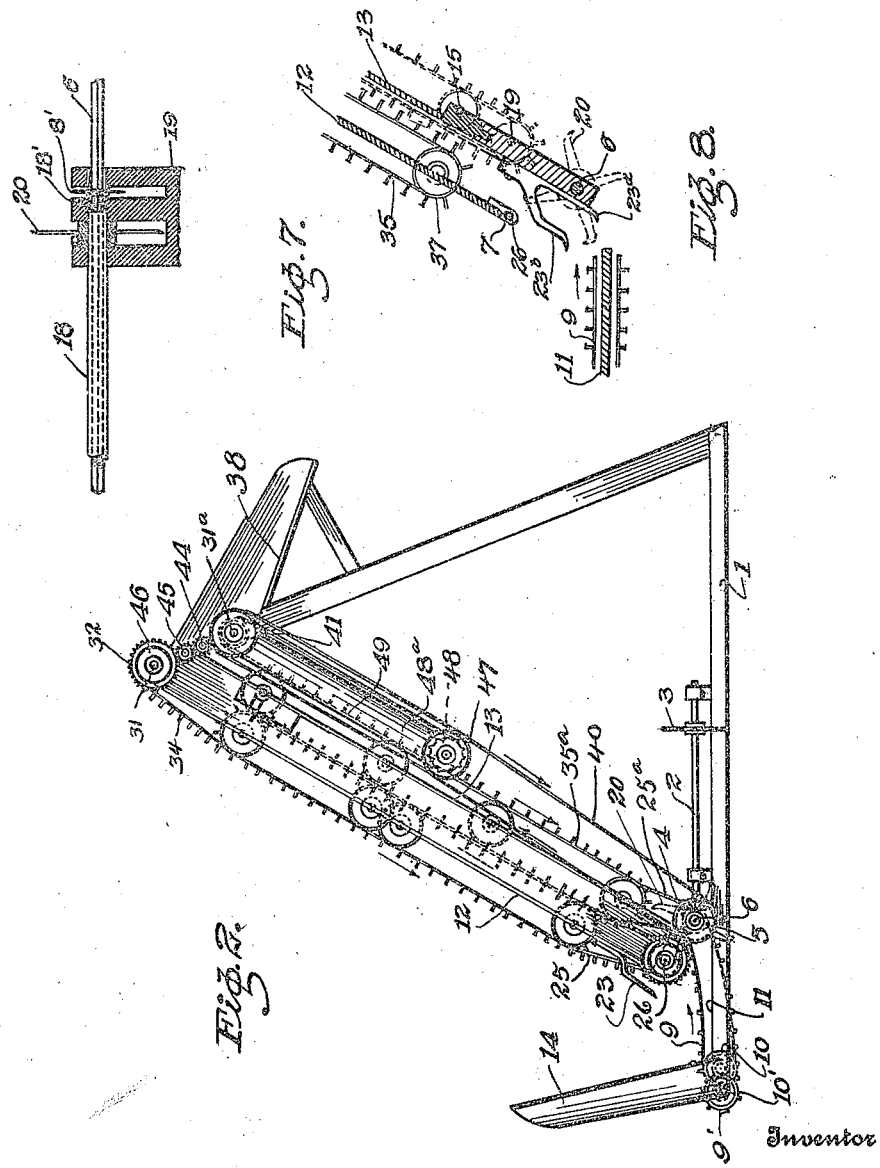

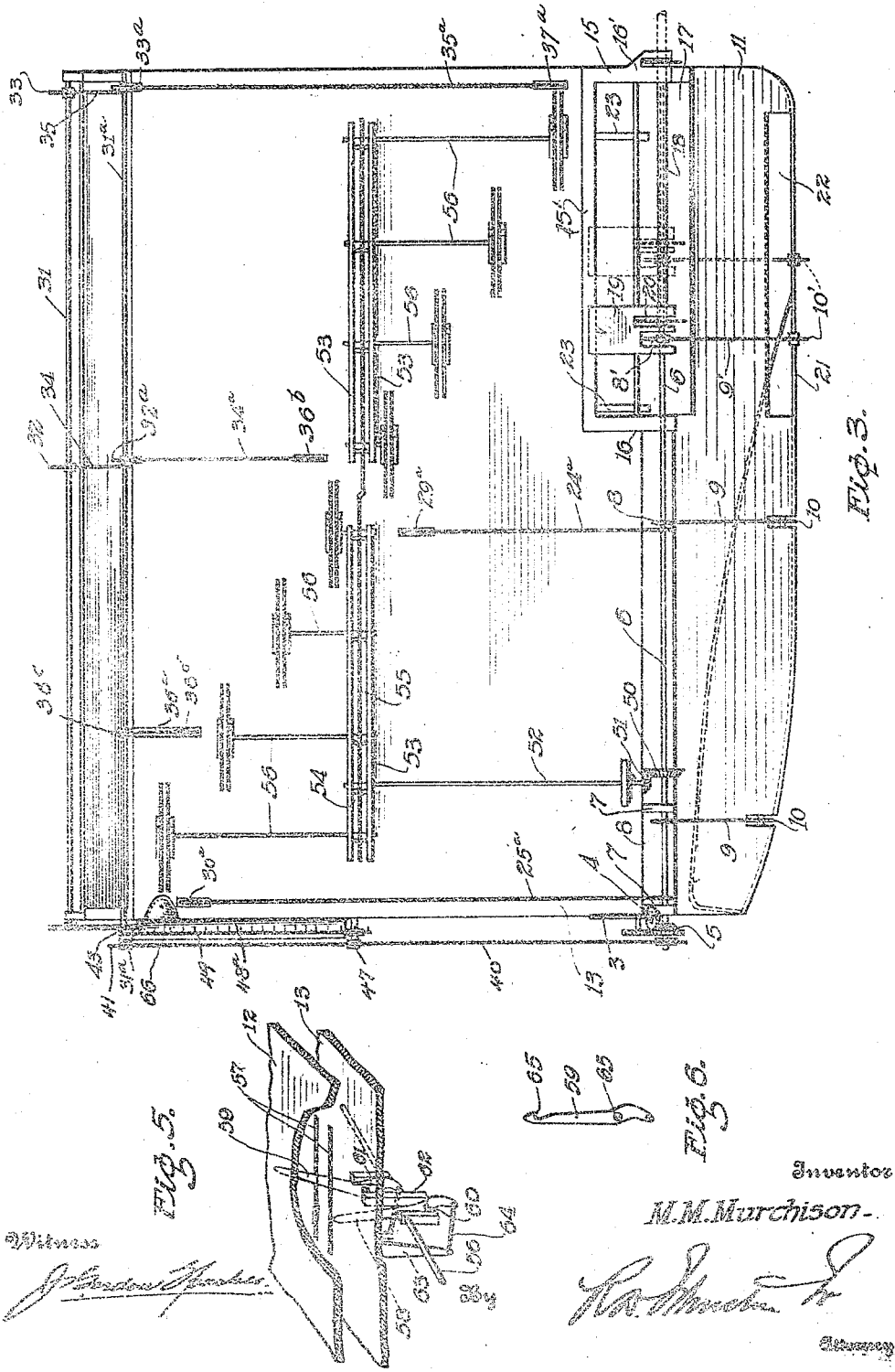

UNITED STATES PATENT OFFICE.

MILLER M. MURCHISON, OF NEW DECATUR, ALABAMA.

CANE-STRIPPING APPARATUS.

1,254,926.  Specification of Letters Patent.  Patented Jan. 29, 1918.

Application filed March 11, 1916. Serial No. 83,597.

*To all whom it may concern:*

Be it known that I, MILLER M. MURCHISON, a citizen of the United States of America, residing at New Decatur, in the county of Morgan and State of Alabama, have invented certain new and useful Improvements in Cane-Stripping Apparatus, of which the following is a specification.

My invention relates to a cane stripping machine which is especially designed as an attachment to or for use following corn harvesters so as to receive the stalks and, after cutting off the tops, to pass the same by suitable conveyers up between spaced walls which hold the cane in position to be operated upon by reciprocable stripper blades which are disposed to work between the conveyers and strip the leaves from the stalks and deliver the same to a fodder elevator at the front end of the apparatus while the stalks are discharged to the side from the top of the apparatus.

My invention comprises novel details of construction and arrangement of parts which in their preferred embodiment only are illustrated in the accompanying drawings which form a part of this specification, and in which:—

Figure 1 is a front perspective view of the stripping apparatus.

Fig. 2 is an end elevation looking from the right of Fig. 1.

Fig. 3 is a bottom view looking at the back wall in plan.

Fig. 4 is an enlarged detail view of the fodder conveyer and driving connections from the lower to the upper driving shaft.

Fig. 5 is a detail view of a pair of stripper blades and their operating mechanism shown in perspective.

Fig. 6 is a detail view of one of the stripper blades which delivers the fodder to the fodder conveyer.

Fig. 7 is an enlarged detail view of the adjustable slide carrying the cutter head and the driving connections therefor.

Fig. 8 is an enlarged sectional view of the yoke carrying the cutter head and provided with the preferred arrangement of stalk guides which, for the sake of clearness, are omitted from Figs. 1 and 2.

Similar reference numerals refer to similar parts throughout the drawings.

As illustrated, the apparatus is made upon a bed frame 1 which is suitable for attachment to the rear end of any standard type of corn harvesting machine (not shown), or if not so attached may be made portable by mounting same on wheels. Mounted upon the frame is a main drive shaft 2 having a sprocket 3 which is driven by a motor or from the harvesting machine and which, by means of a beveled gear 4 and a meshing gear 5, serves to transmit motion to main drive shaft 6 which extends lengthwise of the machine and is square except where it is mounted in suitable bearings 7 secured to the front wall 12 of the apparatus. Mounted on this shaft are a plurality of sprocket gears 8, 8' which drive endless carrier chains 9, 9' which pass around sprockets 10, 10' journaled along the outer edge of a horizontal receiving platform 11 for the unstripped corn stalks. The upper flight of chains pass from the outer edge of this platform across its top face toward front and back spaced walls 12 and 13, respectively, which form an inclined shallow guide passage through which the stalks are fed upwardly and in which the stripping operation takes place. Along the outer edge of the platform is a guard 14 and at the far end of the platform, where the heads of the stalks fall, I provide a cutting mechanism for topping or cutting off the heads of the stalks which may be described as follows:—A rigid metal bearing frame 15 is attached to the rear wall 13 and provided with two bearing arms 16, 16' which project beyond the edge of the wall and opposite a cut away space 17 in the platform 11. A driving shaft 6 is also journaled in this frame 15 and has a square portion between the arms 16. A sliding cutting mechanism comprises a double yoke 19 transversely slotted to receive the shaft 6 and also a sleeve 18 which slides freely on the square shaft 6 and has a thrust bearing 18' on the middle web of the yoke (see Fig. 7). The rear end of the yoke is grooved to slide on a guide 15' formed on the rear edge of the frame 15. In this double yoke is mounted the driving sprocket 8' for the carrier chain 9' and a rotating cutter head 20, which parts are rotatably driven and yet adjustable with the head 19 lengthwise of the platform. The outer sprocket 10' for chain 9', in order to follow the adjustment of sprocket 8', is mounted free to slide on a bearing rod 21 which traverses a cut away portion 22 in the platform 11. The sprocket 8' has a square socket to receive and slide along on the shaft 6 when the yoke is adjusted along its guides. The cutter head 20 is fast on the sleeve 18 and hence both the cutter head and sleeve will be slipped to the right or left (Fig. 3) on shaft 6 as the yoke 19 is adjusted. The outer end of sleeve 18 has a double bearing in the bearing arm 16' which is made yoke like to receive a sprocket wheel 8" having a slot and pin driving connection to the sleeve 18 and therefore does not interfere with the adjustments of the sleeve. The sleeve 18 and cutter 20 is driven by a short endless chain running over sprocket 16", which is fast on end of countershaft 26, and around sprocket 8" which receives sleeve 18. Overhanging guide arms 23 are attached to the front wall 12 and adapted to project over the frame 15 so as to guide the stalks over the cutter and cause them to fall in proper position on the platform. The guides for holding the stalks in position to be operated on by the cutter head is shown in Fig. 8 and comprise a bottom guide and square edge cutter base 23ª which gives the cutter a scissors like effect on the cane stalks and which is inclined toward and extends to the top level of the platform 11. An upwardly curved guide finger 23ᵇ extends forward beyond the sweep of the cutter blades and forms with cutter base 23ª a contracted neck into which the carrier chains 9 and 9' force the stalk heads and which thus hold them during the cutting operation. The stalks being flexible will pull out of this neck when moved by the carrier chains for the stripping operation.

The elevating mechanism takes the stalks in hand after they have been topped, in the following manner: After topping the stalks they lie opposite the bottom opening between the walls 12 and 13 in position to be picked up first by a pair of carrier chains 24ª and 25ª which are driven by sprockets fast on the main shaft 6. The lugs on the chains 24ª and 25ª are disposed to engage and draw the stalks upwardly through the narrow stripping space between walls 12 and 13 and they pass around idler sprockets 29ª and 30ª which are journaled on the wall 13 and so disposed that the chain 24ª will carry the stalks to a half lift and the chain 25ª will carry the stalks almost to the top of the stripping space. A short chain 36ª driven by sprocket 36ᶜ on shaft 31ª and passing over idler sprocket 36ᵈ, carries the stalks to the top of the machine. The shaft 31ª is journaled to the back wall 13 at the top of the stripping space and also carries a pair of sprockets 32ª and 33ª, which, by means of drag chains 34ª, 35ª passing over idlers 36ᵇ and 37ª, serve with chains 36ª to lift the stalks to the top of the stripping space where they pass off through a chute 38. The sprockets 29ª, 30ª and 37ª are disposed in a diagonal alinement crosswise of the apparatus, the two chains at the right (Fig. 3) and chain 36ª being driven from the top by shaft 31ª and the two chains on the left being driven from the bottom of the apparatus by main shaft 6. The shaft 31ª is driven by a sprocket 39 on the outer end of main shaft 6, chain 40 and sprocket 41, fast on the outer extended end of shaft 31ª. A sleeve 42 is loose on shaft 31ª between cog 43 and sprocket 41. A train of gears 44, 45 and 46, transmit motion from cog 43 to shaft 31ª journaled to top of front spaced wall 12, the intermediate gears being suitably journaled to the front end of the apparatus. The chain 40 also drives a sprocket 47 which turns with it a sprocket 48 disposed at the bottom of an inclined trough 48ª for the fodder leaves which are ejected thereinto by the stripping mechanism. The sprocket 48 drives a fodder conveyer chain 49 which travels upwardly along the trough 48ª and slides over a grooved idler cuff 49ª which turns on the sleeve 42. A sprocket drive at the top of the trough would become fouled by the fodder leaves.

While the conveying mechanism which I have described might be ample for the purposes of feeding the stalks through the stripping compartment, I nevertheless consider it advisable to provide on the front wall 12 a set of conveyers which are shown in Fig. 1 and numbered 24, 25, 34 and 35, the chains 24 and 25 being driven by sprockets from the shaft 26, which is driven from main shaft 6 by meshing gears 27 and 28. The chains 34 and 25 are driven by sprockets on the shaft 21 journaled at the top of the wall 12. The chains 24 and 24ª work in close relationship and the other similarly numbered pairs of chains also work in close relationship, each co-acting pair of chains being driven so that the flight of the stalk engaging lugs during their passage through the stripping compartment travel in the same direction but will project in opposite directions, thus serving to grip between them the stalks and hold them firmly during the stripping operation. It will be noted that the conveyer chains on both sides of the compartment are so disposed as not to cross the diagonal line of the stripping blades.

The stripping mechanism is driven by means of a beveled gear 50 on shaft 6 which by means of a gear 51 drives a vertical shaft 52 journaled on the outside of the rear wall 13 of the stripping compartment. At its upper end the shaft 52 is journaled on a pair of spaced longitudinal bearing blocks 53, between which it is provided with a crank portion 54 which engages and reciprocates a pitman 55. This pitman 55 engages the crank ends of a series of stripper shafts 56 which are also journaled in the bearings 53 and are of variable length so that the mechanism driven thereby is disposed so as to occupy a diagonal relationship across the stripping chamber. The bearings 53 are disposed about midway of the wall 13 and the shafts 56, which drive the strippers above the bearings 53, extend upwardly and those which drive the strippers below the bearings 53 extend downwardly. In describing the stripper mechanism, reference is made to Fig. 5, where it will be seen that the bottom wall of the stripping compartment is provided with pairs of parallel narrow slots 57 and through which work the pairs of stripper blades 58 and 59. These blades, except the pair nearest the trough 48ª, are similar and are journaled on crank pins 60 and 61 mounted in a crank frame 62 fast on a shaft 56. As shown, the crank pins are disposed equi-distantly above and below the center line of the shaft 56 and opposite each stripper plate is a standard 63 made fast to the rear wall 13 and connected at its outer end by a link 64 with the end of the opposite stripper blade below its crank pin 60 or 61. From this arrangement it follows that the standard 63 and pin 64 limit the lower ends of the stripper blades to travel through an arc with the link for a radius, while the crank pins themselves carry the lower ends of the stripper blades through a circular path of travel. The result is that the working or upper ends of the stripping blades are caused to rise up through the slots 57 at the left hand end thereof (Fig. 5) and to reach their maximum projection as they start forward and to travel bodily with a straight forward stroke until they approach at the right hand end of the slots, whereupon they take a quick receding stroke and withdraw downwardly through the slots and make their return stroke below the wall 13 or with their upper ends traveling in or below the slots. The last acting pair of blades have hooks 65 in their forward edges so as to engage and pull the fodder downwardly and inwardly into trough 48ª.

As the topped stalks are passed upwardly through the stripping space they are maintained in substantially parallel position by their carrier chains and they will be acted upon successively by the pairs of stripper blades which are so arranged that they act, beginning at the top end of the stalk, and each working over its respective part of the stalk until the top or final pair of strippers work opposite the butt of the stalk and opposite the fodder spout 48ª. The carrier chains moving always upwardly carry with them the loose fodder leaves as well as the stalks and thus the successive stripping blades not only strip but serve as a feeding means to direct the fodder endwise of the apparatus until it is all concentrated in position to be discharged by the topmost pair of strippers into the fodder trough. A suitable opening 66 in back wall 13 is left in front of this topmost pair of strippers at the front end of the apparatus so as to provide for the discharge of the fodder into the trough 48ª. The stripped stalks fall over the top of the back wall 13 and pass off through the chute 38, being stripped and controllable in any suitable manner.

Having thus described the preferred embodiment of my invention, what I claim as new and desire to secure by Letters Patent, is:—

1. A cane stripping apparatus comprising a stripping compartment, means to deliver the cut stalks in horizontal position to said compartment, means to move the stalks sidewise through said compartment, and a plurality of diagonally arranged strippers adapted to successively engage and strip the stalks as they are passed through said compartment.

2. In a cane stripping apparatus, in combination, a platform into which the unstripped stalks fall, a stripping compartment opening onto the platform, means to advance the stalks sidewise across the platform and up through said compartment, means to top the stalks, a plurality of strippers disposed crosswise of the stripping compartment so as to act on the whole stalk, and means to operate said strippers to cause them to alternately move alongside of and then to clear the stalks so as to permit them to continue their passage through the stripping compartment.

3. In a cane stripping apparatus, a plurality of strippers comprising arms, a slotted wall over which the cane is fed and through the slots in which said strippers periodically project, means to move said strippers in a direction lengthwise of the cane, and means to feed the cane transversely to the motion of the strippers.

4. In a cane stripping apparatus, a slotted wall, means to feed the cane sidewise over said wall, a plurality of pairs of stripper blades mounted below said wall, and driving means for moving said blades through a path of travel which causes them to project through the slots in said wall throughout one part of their travel and to sink below the upper portion of the wall throughout the other part of their travel, the blades of each pair being disposed to come alternately above the wall and act one at a time on the cane, substantially as described.

5. In a cane stripping apparatus, a stripping compartment, means to feed cane sidewise through said compartment, and a plurality of stripping mechanisms disposed to act successively on different parts of the cane and jointly to strip the cane, each of said mechanisms comprising a pair of arms, links having a fixed pivot and connected to the under ends of said arms, cranks 180° apart and connected to an intermediate part of the under portions of the arms, there being slots in the stripping compartment through which the upper ends of said blades project during a portion of their travel, and means to drive the crank, substantially as described.

6. In a cane stripping apparatus, a bottom horizontal platform upon which the cane falls after being cut, an inclined stripping compartment leading upwardly from the platform, and a plurality of laterally movable strippers which act successively on the cane and are arranged to progressively feed the fodder stripped from the cane toward the front end of the machine.

7. In a cane stripping apparatus, a cane receiving platform disposed in the line of travel of the apparatus, a topping means for cutting off the heads of the cane disposed at the rear end of the platform, means to advance the cane transversely across the platform and into engagement with said topping means, a stripping compartment into which the cane is delivered horizontally, strippers acting on the stalks to strip the fodder therefrom, the strippers being arranged to act successively from the head to the butt end of the cane as it is passed through said compartment, and means at the forward end of the compartment to receive and discharge the fodder collected there by the progressive action of the strippers.

8. In a cane stripping apparatus, a stripping compartment, and means to pass the cane in substantially horizontal position therethrough, a diagonal series of strippers working lengthwise of and successively on the cane as it is advanced through said compartment, the said means to advance said cane through the compartment comprising a set of carrier chains operating from the diagonal series of strippers toward the top of the compartment, and another set of carrier chains working from the bottom of the compartment toward said series of strippers, none of said carrier chains crossing the diagonal line of strippers.

9. In a cane stripping apparatus, a stripping compartment inclined upwardly and laterally of the apparatus, spaced walls, carriers to advance the stalks in horizontal position sidewise through said compartment, a diagonal series of strippers to successively act on and strip the fodder from the stalks as they are passed through said compartment, said strippers and conveyers acting to convey the fodder to one end of the apparatus, and a trough to receive the fodder.

10. In a platform disposed from front to rear of the machine and adapted to receive the cut cane, a cane stripping apparatus, a stripping compartment rising at an incline from one side edge of the platform, spaced walls, carriers to advance the stalks sidewise across said platform and upwardly through said compartment, a diagonal series of strippers to successfully act on and strip the fodder from the stalks as they are passed through said compartment, said strippers and conveyers acting to convey the fodder to the forward end of the apparatus, a trough to receive the fodder, and a conveyer chain moving in said trough and adapted to discharge the fodder therefrom, substantially as described.

In testimony whereof I affix my signature.

MILLER M. MURCHISON.

Witness:
NOMIE WELSH.